United States Patent
Quinn et al.

(10) Patent No.: US 8,175,780 B2
(45) Date of Patent: May 8, 2012

(54) ADAPTIVE UNDERSPEED CONTROL

(75) Inventors: Terrence A. Quinn, Germantown Hills, IL (US); Michael K. Oudyn, Yorkville, IL (US); Igor M. Strashny, Kobe (JP); Christian Poulet, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 726 days.

(21) Appl. No.: 12/341,767

(22) Filed: Dec. 22, 2008

(65) Prior Publication Data

US 2010/0161186 A1  Jun. 24, 2010

(51) Int. Cl.
*F16H 61/46* (2010.01)
*G06F 19/00* (2006.01)

(52) U.S. Cl. ............... 701/54; 701/29; 701/35; 318/432

(58) Field of Classification Search ............... 701/54, 701/50, 29, 35; 318/432; 414/685; 477/43; 60/448, 452
See application file for complete search history.

(56) References Cited

U.S. PATENT DOCUMENTS

| | | | |
|---|---|---|---|
| 3,886,742 A | 6/1975 | Johnson | |
| 3,996,743 A | 12/1976 | Habiger et al. | |
| 4,182,125 A | 1/1980 | Spivey, Jr. | |
| 4,475,380 A | 10/1984 | Colovas et al. | |
| 4,630,685 A * | 12/1986 | Huck et al. | 172/7 |
| 5,077,973 A | 1/1992 | Suzuki et al. | |
| 5,468,126 A * | 11/1995 | Lukich | 417/53 |
| 5,469,646 A | 11/1995 | Takamura | |
| 5,951,258 A * | 9/1999 | Lueschow et al. | 417/22 |
| 5,954,617 A | 9/1999 | Horgan et al. | |
| 5,983,156 A | 11/1999 | Andrews | |
| 6,042,505 A | 3/2000 | Bellinger | |
| 6,083,541 A * | 7/2000 | Hamstra et al. | 426/63 |
| 6,385,970 B1 * | 5/2002 | Kuras et al. | 60/448 |
| 6,387,011 B1 | 5/2002 | Bellinger | |
| 6,436,005 B1 | 8/2002 | Bellinger | |
| 6,496,767 B1 | 12/2002 | Lorentz | |
| 6,546,329 B2 | 4/2003 | Bellinger | |
| 6,819,996 B2 | 11/2004 | Graves et al. | |
| 6,944,532 B2 | 9/2005 | Bellinger | |
| 2002/0132699 A1 | 9/2002 | Bellinger | |
| 2004/0002806 A1 | 1/2004 | Bellinger | |
| 2004/0088103 A1 | 5/2004 | Itow et al. | |
| 2004/0128047 A1 | 7/2004 | Graves et al. | |
| 2004/0148084 A1 | 7/2004 | Minami | |
| 2005/0288148 A1 * | 12/2005 | Kuras et al. | 477/43 |
| 2010/0154403 A1 * | 6/2010 | Brickner et al. | 60/452 |

FOREIGN PATENT DOCUMENTS

WO  8200617  3/1982

* cited by examiner

*Primary Examiner* — Tan Q Nguyen

(74) *Attorney, Agent, or Firm* — Leydig, Voit & Mayer

(57) ABSTRACT

A machine (100) includes an engine (102) connected to an implement pump (204) operating an actuator and to a propel pump operating a motor (106). An electronic controller (218) is disposed to receive at least one parameter selected from the group of: a pressure of fluid at the at least one motor (106), a pressure of fluid at the at least one implement actuator, a rate of rotation of the engine (102), a rate of rotation of the at least one motor (106), and a torque output of the engine (102). The electronic controller (218) monitors the at least one parameter for a predetermined period, and determines an operating mode of the machine (100). The electronic controller (218) then adjusts an underspeed setting for the engine (102) based on the operating mode.

19 Claims, 5 Drawing Sheets

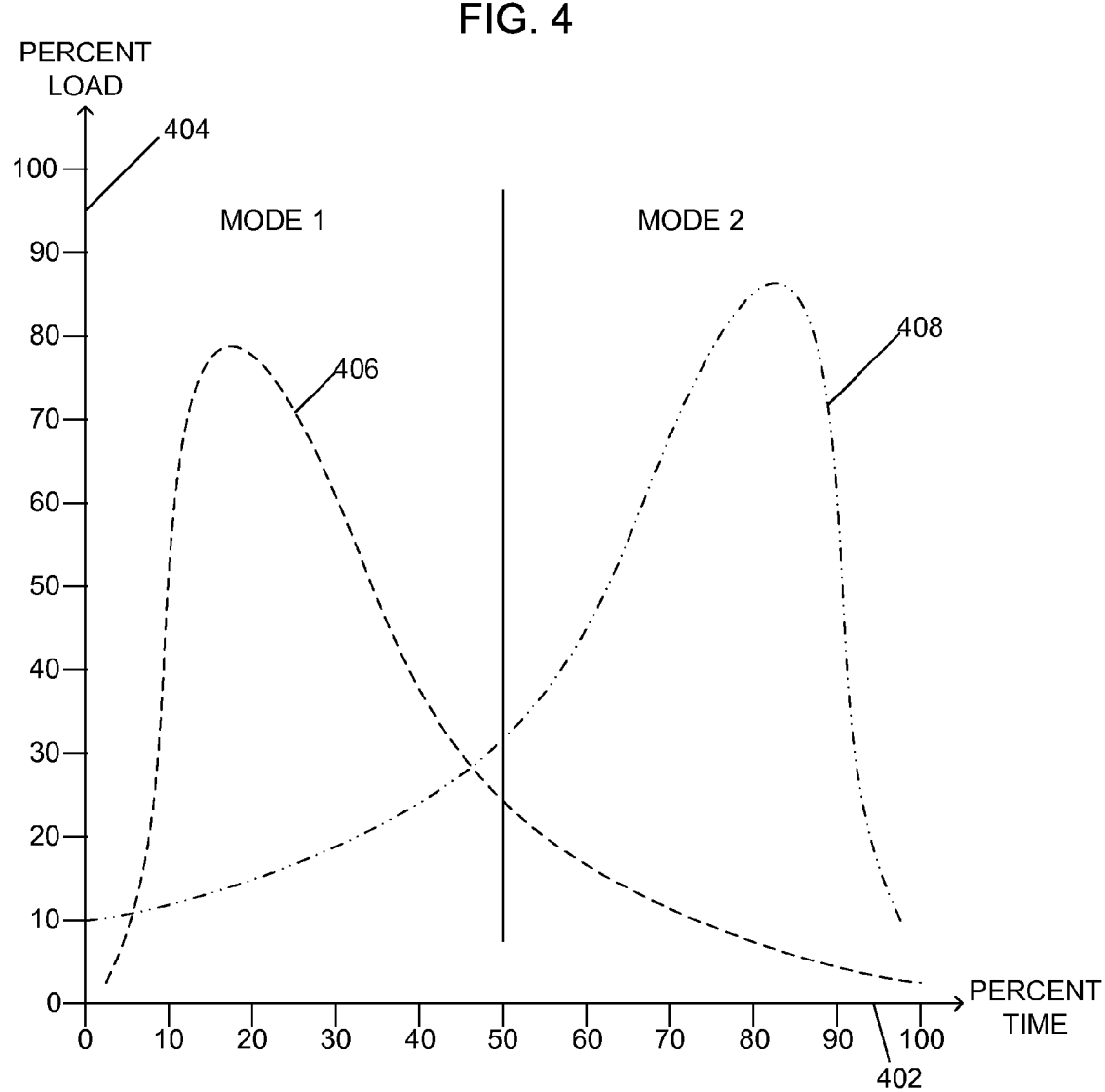

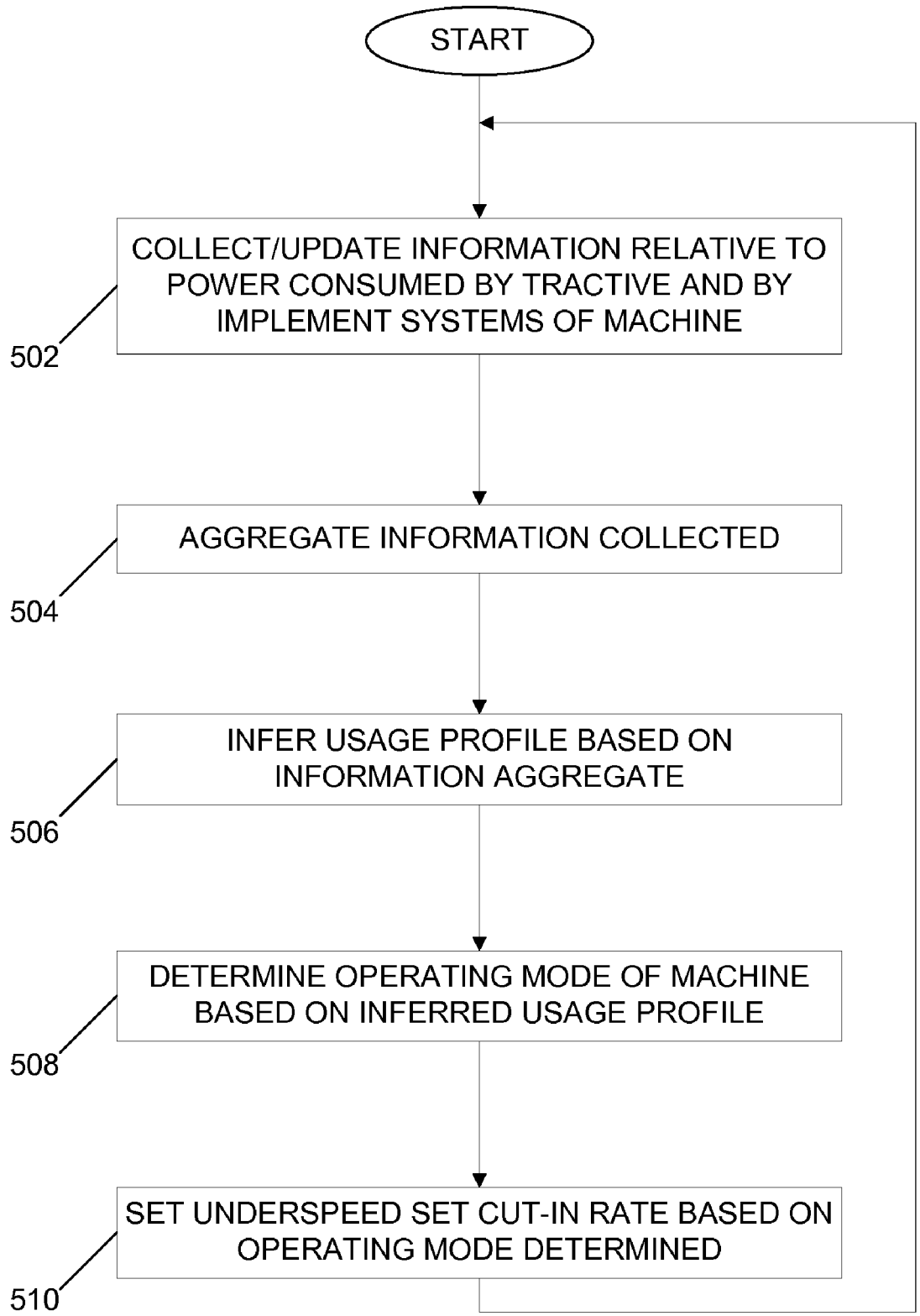

ADAPTIVE UNDERSPEED CONTROL

TECHNICAL FIELD

This patent disclosure relates generally to hydrostatically driven machines and, more particularly, to hydrostatically driven machines having hydraulically operated implements associated therewith.

BACKGROUND

Hydrostatically driven machines having hydraulically actuated implements are known. Such machines typically use an internal combustion engine or another type of prime mover to provide power to one or more hydraulic pumps or transmission systems. Such machines typically operate under varied conditions requiring either power to propel the vehicle, power to operate the implements, or a combination thereof. For example, a loader operating to load loose material onto a truck may perform quickly repeating loading operations that require relatively low loading of the implement and propel systems. Alternatively, an excavator digging into virgin earth may encounter various obstacles, such as rocks and other debris, which demand momentary increased loading of the implement system until the obstacle breaks loose. It is often challenging for a machine to effectively address varying operating conditions while consistently maintaining high productivity, cycle time, and fuel economy.

Various features have been incorporated into electronic controllers associated with such machines to ensure proper operation. For example, an excavator machine attempting to lift a large or otherwise unmovable object encounters a spike in the load required by the implement. Because the implement is hydraulically driven, the increased load translates to an increased hydraulic fluid pressure at the hydraulic pump operating the implement. Hydraulic pumps are typically connected to the engine of the machine, such that an increased pressure at the pump under these conditions tends to stall the pump, and with it, the engine. To avoid such conditions, most modern machines have electronic controllers that limit the speed the engine may obtain during operation. This limit is implemented as a set-point that is either pre-programmed into the controller or as a series of discrete values that are selected by the machine operator based on the type of operation the machine is performing. This limit is known as an underspeed setpoint. Thus, when encountering a potential stall condition, the electronic controller operates to maintain engine speed at the selected setpoint.

Prior attempts to provide the operator with control over an appropriate engine or transmission underspeed set point, depending on the operating mode of the machine, have been provided. Past solutions generally include selector switches or knobs placed in the operator cab to allow an operator to select a desired setpoint operating mode for the machine. However, these predetermined and manually selectable modes of operation are not efficient in optimizing operation of the machine when the machine is operating under a mode that is not closely related to one of the modes the operator can select. Moreover, an operator may neglect to change the mode of the machine when performing mixed tasks. These limitations often result in under-optimized machine performance, increased fuel consumption and increased noise output by the machine, as well as higher cycle times when performing various tasks. From a broader perspective, under-optimized machine performance on a regular basis may lead to shorter service intervals and increased downtime for repairs and service.

SUMMARY

The disclosure describes, in one aspect, a machine that includes an engine connected to an implement pump operating an actuator and to a propel pump operating a motor. An electronic controller is disposed to receive at least one parameter selected from the group of a pressure of fluid at the at least one motor, a pressure of fluid at the at least one implement actuator, a rate of rotation of the engine, a rate of rotation of the at least one motor, and a torque output of the engine. The electronic controller determines an operating mode of the machine from the at least one parameter. The electronic controller then adjusts an underspeed setting for the engine based on the operating mode.

In another aspect, this disclosure provides a method for operating a machine having a tractive system and an implement system each operating with hydraulic power. The method includes operating an engine at an engine speed that is greater than an underspeed setpoint thus generating power. The power is divided into tractive power and implement power while being used or consumed by the respective systems. Tractive information relative to power consumed by the tractive system of the machine and implement information relative to power consumed by the implement system of the machine are collected and processed by the controller. A usage profile for the machine that is based on tractive information and implement information processed is determined and used as a basis for a determination of the operating mode of the machine. The underspeed set cut-in rate is adapted based on the operating mode determined.

In yet another aspect, a control algorithm for improving productivity and power utilization of a machine is disclosed. The control algorithm is executed within an electronic controller associated with a machine and disposed to receive information from the propel and implement hydraulic circuits. The control algorithm uses information associated with data obtained from at least one sensor disposed to measure a pressure of hydraulic fluid in at least one of a propel hydraulic circuit and an implement hydraulic circuit of the machine. Information already collected is continuously updated and processed to obtain an inferred usage profile for the machine. The algorithm determines a mode of operation of the machine based on the inferred usage profile. Finally, the algorithm adaptively sets a desired underspeed cut-in rate for the machine based on the determined mode of operation.

BRIEF DESCRIPTION OF THE DRAWINGS

FIG. 4 is a qualitative graph of a histogram in accordance with the disclosure.

FIG. 5 is a flowchart for a method in accordance with the disclosure.

DETAILED DESCRIPTION

This disclosure relates to hydrostatically or electrically driven machines. In the embodiment described below, a tracked loader is disclosed. It should be appreciated, however, that other types of machines can benefit from the embodiments disclosed herein. In the present embodiment, an electronic controller associated with the machine is operably connected to various machine components and systems. The controller operates in a logical fashion to transmit and receive information relative to the operation of the vehicle. Various sensors located throughout the vehicle provide information to the electronic controller concerning an operating state of the vehicle. For example, various pressure sensors may be arranged to provide information about various pressures in a drive circuit or in an implement circuit of the vehicle during its operation. Various other sensors, such as one or more speed sensors associated with either the engine or a transmission, may provide data indicative of the rotational speed of these components to the electronic controller.

The electronic controller may be further capable of communicating either directly or indirectly with the engine of the vehicle, such that an underspeed set point may be supplied to the engine during service. These functions of the vehicle may advantageously be carried out automatically and independent of any selections that may be required by the operator. In this fashion, the vehicle may operate with improved overall machine productivity and power utilization, thus decreasing fuel consumption and cost of ownership for the operator.

Figure 1:
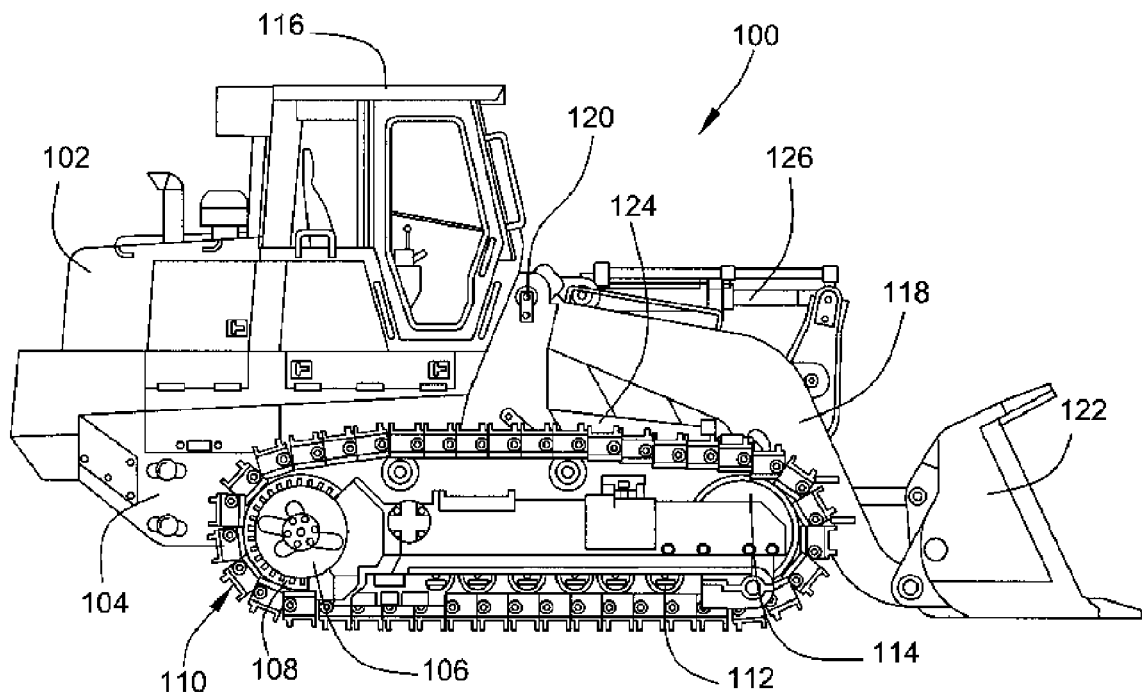
FIG. 1 is a side elevation of a tracked loader in accordance with the disclosure.

An outline view of a machine 100 is shown in FIG. 1. The term "machine" is used generically to describe any machine having a hydrostatically operated propel circuit for moving the machine across the terrain, and having a hydraulically operated implement circuit operating an implement for performing various machine tasks. The machine 100 is a tracked loader used for the sake of illustration only.

In the illustrated embodiment, the machine 100 includes an engine 102 connected to a frame or chassis 104. The engine 102 is arranged to operate one or more hydrostatic pumps (not shown) that are configured to operate one or more propel motors 106. In an alternate embodiment, the engine 102 may be connected an electrical power generator (not shown) that is arranged to operate one or more electric motors (not shown). In the embodiment illustrated, each propel motor 106 drives a gear 108, which is meshed with a track 110. When the gear 108 rotates, the track 110 is urged to rotate and propel the vehicle. In this type of tracked vehicle, the track 110 rotates around a series of pulleys 112 and a free rotating drum 114, which align the moving track 110 with the chassis 104. As can be appreciated, the machine 100 may be propelled either forward or in a reverse direction depending on the rotation of the gear 108.

An operator cab 116 containing various controls for the machine 100 is connected to the chassis 104. The operator cab 116 includes a seat for the operator and a series of control levels, pedals or other devices that control the various functions of the machine 100. Lift arms 118 (only one seen in this view) are connected to the frame of the machine 100 at a hinge 120. The lift arms 118 can pivot about the hinge 120 so that a bucket 122, or any other implement, may be raised or lowered by the machine 100. The pivotal motion of the lift arms 118 is controlled by lift cylinders 124. In this embodiment, the bucket 122 may be tilted by tilt cylinders 126 via a linkage system. The lift cylinders 124, the tilt cylinders 126, the gear 108, and other actuators and/or motors on the machine 100 may be operated by hydraulic systems or systems selectively providing pressurized fluid to these actuators during operation.

Figure 2:
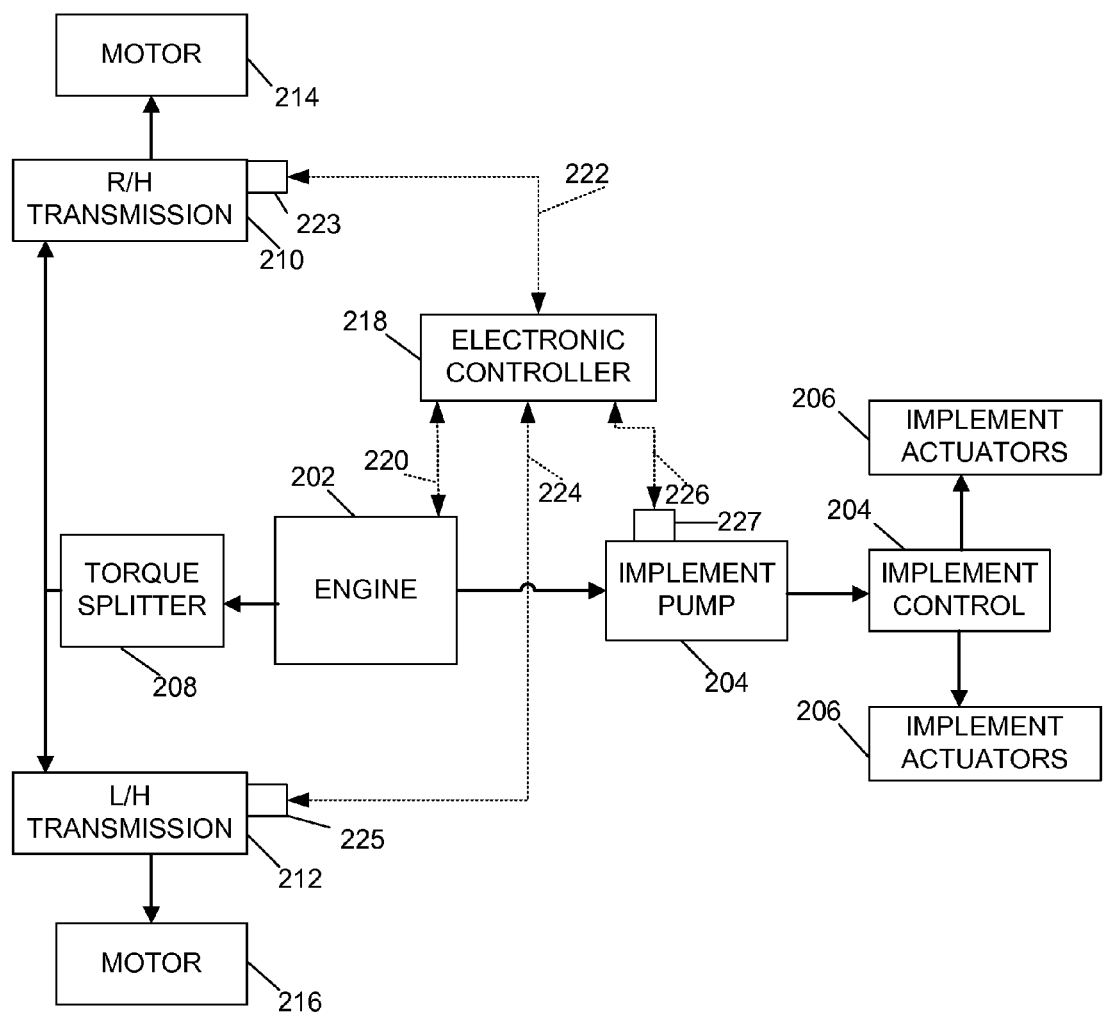
FIG. 2 is a block diagram of the engine and associated hydraulic circuits of the machine shown in FIG. 1, in accordance with the disclosure.

A simplified block diagram of the engine and various other hydraulic systems of the machine 100 is shown in FIG. 2. The machine 100 includes an engine 202 that is directly connected to an implement pump 204 such that rotation of the engine causes a rotation of the implement pump 204. Alternatively, the engine 202 may be connected to a generator (not shown). The pump 204 yields a supply of pressurized hydraulic fluid that is supplied to an implement control 205, which may include one or more valves or other devices that individually control the flow of fluid to and from the various actuators of the machine 100. In this embodiment, for the sake of simplicity, two implement actuators 206 are shown connected to the implement control 205. These two implement actuators 206 may be, for example, the lift cylinders 124 and tilt cylinders 126 that are illustrated in FIG. 1.

The engine 202 is also connected to a torque splitter 208. The torque splitter 208 may be a fixed or a variable gear transmission that accepts a torque input via rotating shaft from the engine 202. The torque splitter 208 distributes this torque to a right hand transmission 210 and a left hand transmission 212. The right hand transmission 210 and left hand transmission 212 operate independently of each other, such that the tracked vehicle shown in FIG. 1 is moveable in various directions. The right hand transmission 210 is connected to a hydrostatic motor 214. Similarly, the left hand transmission 212 is connected to an additional hydrostatic motor 216. In accordance with the description provided above in relation to FIG. 1, the motor 214 connected to the right hand transmission 210 may be the motor 106 as shown in FIG. 1, which operates the drive gear 108 causing the track 110 to move relative to the vehicle. In an alternate embodiment, electric motors may be connected to the transmissions 210 and 212.

An electronic controller 218 is arranged to communicate with various components on the machine 100. In this embodiment, shown simplified for the sake of clarity, the electronic controller 218 can supply and receive information to and from sensors and actuators (not shown) associated with the engine 202 via an engine communication bus 220. The engine communication bus 220 may be an analog and/or digital communication bus, which can include one or more channels that effectively communicate data and command signals between the electronic controller 218 and the sensors and actuators (not shown) associated with the engine 202. In a similar fashion, the electronic controller 218 may be connected to the right hand transmission 210 and the left hand transmission 212 via, respectively, a right hand communication line 222 and a left hand communication line 224. The right hand communication line 222 may connect the electronic controller 218 to a right hand drive sensor 223 that is integrated with the right hand transmission 210. The right hand drive sensor 223 is arranged to sense and provide data indicative of the rotational speed and/or the pressure of hydraulic fluid operating the motor 214 (FIG. 2) to the electronic controller 218. Similarly, the left hand communication line 224 may connect the electronic controller 218 to a left hand drive sensor 225 that is integrated with the left hand transmission 212. The left hand drive sensor 225 is arranged to sense and supply data indicative of the rotational speed and/or the pressure of hydraulic fluid operating the motor 216 (FIG. 2) to the electronic controller 218.

In a similar fashion, the electronic controller 218 may be connected to one or more sensors 227 that are associated with the implement pump 204, which connection is established via an implement communication line 226. The data supplied to the electronic controller 218 from the sensors 227 may be indicative of the rotational speed of the implement pump 204 and/or the pressure of fluid passing through the implement pump 204 during operation. This information may be used by the electronic controller 218 to automatically distinguish the operating mode of the vehicle as well as command other operating parameters that can improve the efficiency and operation of the machine 100.

Figure 3:
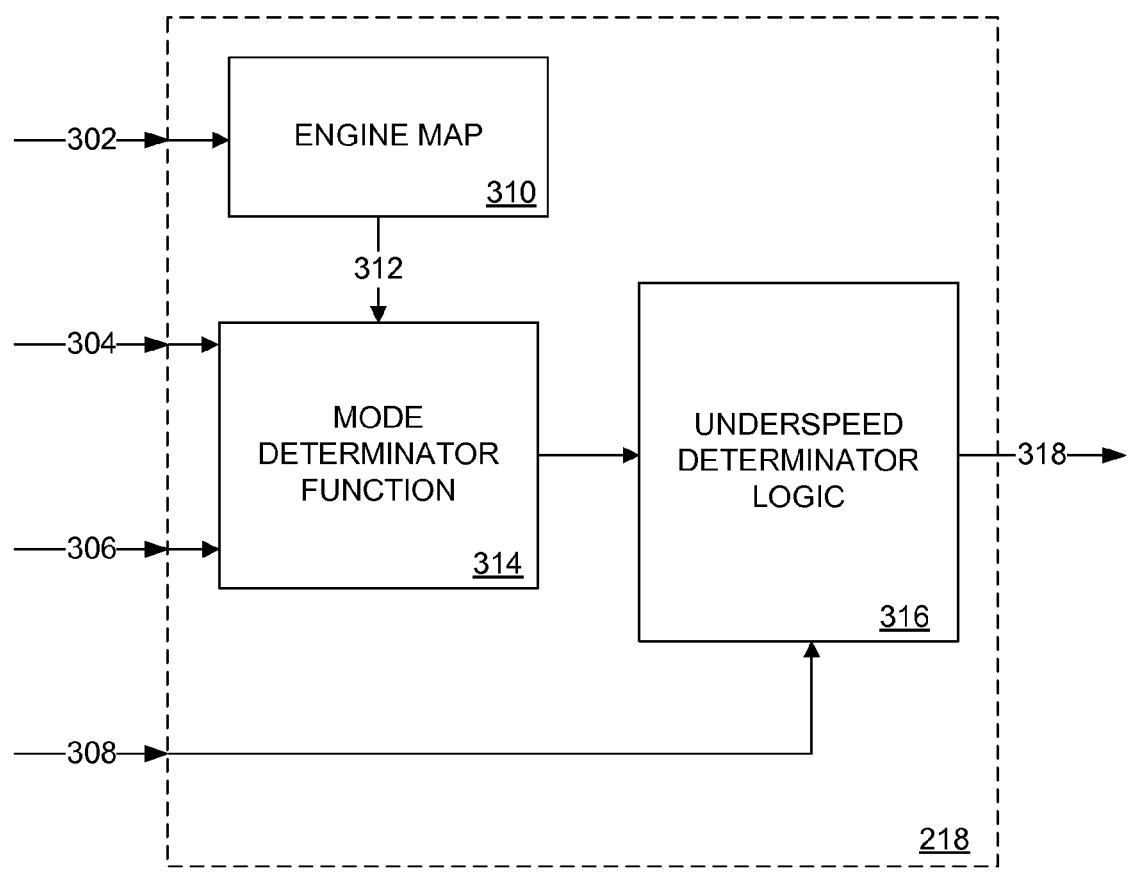
FIG. 3 is a functional diagram of an electronic controller in accordance with the disclosure.

A functional diagram, which qualitatively shows at least some of the functions performed by the electronic controller 218, is shown in FIG. 3. The electronic controller 218 is arranged to receive, generally, four types of input information from four different sources relative to the operation of the vehicle. Specifically, the electronic controller 218 may first receive information relative to the operating state of the engine via a first input node 302. Information indicative of the operating state of the propel system of the machine, which includes the motors 214 and 216 and/or other driving devices that propel the vehicle, may be input to the electronic controller 218 via a second input node 304. Information indicative of the operating state of an implement drive circuit may be input to the electronic controller 218 via a third input node 306. Finally, the electronic controller 218 may be arranged to receive input at a fourth input node 308 that is indicative of operator commands. Other input information may also be provided to the electronic controller 218.

Data indicative of the operating state of the engine, such as engine speed or torque output, which enter the electronic controller 218 via the first input node 302, may be accessed by an engine map look-up function 310. The engine map look-up function 310 may include information relative to optimized engine operating points that are determined based on the engine's operating speed and operating load. The output from the engine map look-up function 310 may be an appropriate engine parameter 312, for example, an instantaneous engine speed or torque output, which is relayed to the mode determinator function 314.

The mode determinator function 314 may, in addition to the engine parameter 312, receive information provided to the electronic controller 218 via the third input node 306 and the fourth input node 308. This information may be used to determine a calculated available power in the machine 100, or a ratio thereof, that is consumed by either the propel circuit or the implement circuit. The calculated available power for the systems of the machine 100 can be determined by calculations that are based on the engine parameter 312, which is also input to the mode determinator function 314. With such information, the mode determinator function 314 may perform various calculations and/or data manipulations to determine an actual operating mode of the machine.

Before proceeding with the description, a few examples may be used to illustrate three of the various operating modes of the machine 100. The first example is when the machine 100 is engaged in an operation requiring high cycle times at relatively low implement loads, such as during a truckloading operation. In this instance, the engine may operate at a relatively low power output but at a high speed to provide an adequate supply of fluid to the implement circuit. The power consumed by the driving or propel and implement circuits loads may be relatively low. The second example is when the machine is operating in a mode requiring greater forces to be applied by the implement, for instance, when the machine is digging into a hard substrate, a mode also known as pioneering. In this mode, the engine of the machine may operate at a relatively high power output, the majority of which may be used by the implement circuit. Finally, a third example may be illustrated when the machine 100 is dragging an implement across the substrate, for example, a ripper or tiller attachment. In this mode, the engine may operate at a relatively high power output, but in this instance, the majority of the power produced by the engine is consumed by the propel or driving circuits.

The actual operating mode of the machine determined in the mode determinator function 314 may be a mode selected from two or more predetermined operating modes. Alternatively, the mode determinator function 314 may calculate a continuously adapting mode that tracks the actual operation of the machine. In either instance, the mode determinator function 314 provides a value indicative of the machine's operating mode to an underspeed determinator logic function 316.

The underspeed determinator logic function 316 may receive the value indicative of the machine's operating mode from the mode determinator function 314 and, in combination with the operator input entering at the fourth input node 308, determine an optimum underspeed setpoint for the engine. The underspeed setpoint is appropriate for the actual operating conditions of the machine in the illustrated embodiment. For example, the underspeed setpoint may be set high in a truckloading mode to ensure operation at a high engine speed, and may be set low when in a pioneering or ripping mode, to guard the machine against stalling during unexpected load increases. Thus, "optimum" as used herein should not be construed as the best operating mode but, rather, as an operating mode that is appropriate for the task the machine is performing at any given time.

This underspeed set point, generally shown as 318, may be supplied to a secondary engine controller (not shown) that directly controls the operation of the engine. As can be appreciated, changed conditions in either the propel or implement circuits of the machine can adaptively cause a change in the underspeed set point 318, thus allowing the machine to operate in an optimal setting under most operating conditions.

The mode determinator function 314 may use continuously updated data to determine the actual mode of operation of the machine. One method by which this can be accomplished is for the mode determinator function 314 to continuously process obtained data relating to the operation of the machine. One example of such data processing is shown in the histogram of FIG. 4.

Turning now to FIG. 4, a histogram graph is presented. In the graph, a horizontal axis separates the various classes of information used to plot the graph. Here, the horizontal axis 402 represents the percentage of time during a pre-determined period of operation of the machine for which data has been collected. For example, the pre-determined period may be set to 10, 20, 30 or more minutes representing periods over which the electronic controller determines incrementally the appropriate operating mode of the machine. Plotted against time, on the vertical axis 404, is the percent load experienced by the machine, where 100 percent corresponds to the maximum load output of the machine and 0 percent represents no loading of the machine. This load parameter can be correlated to either a power and/or torque output of the engine, a pressure of fluid measured at the propel and/or implement systems over time, or any other appropriate parameter. Two sample curves have been plotted on the histogram of FIG. 4 as illustrations of one method for selecting an appropriate mode of operation for the machine. Each of these two curves is described below.

A first curve 406 is shown in dashed lines, and a second curve 408 is shown in dot-dot-dash line. As can be seen from the graph, the first curve 406 represents a mode of operation where the machine operates less than 40% of a fixed time period operating at a relatively high load, for example, a load of about 80%. The machine operates in conditions with low loads or conditions where the load is less than about 40% in this mode. In contrast, the mode of operation represented by the second curve 408 indicates that the machine operates more than 60% of a fixed time period at a high load condition, with lower load conditions occurring less than 50% of the time. For purpose of illustration, one can appreciate that operation of the machine in a condition indicated by the first curve 406 might occur when operating in a truckloading or any other similar mode. The second curve 408 may represent an operating mode of the vehicle that often requires higher loads, for example, when the machine is used for pioneering, ripping, or any other similar mode.

Through the processing discussed above, the electronic controller 218 may build one or more graphs, such as the graph presented in FIG. 4, that plot parameters that are the same or similar to the parameters discussed in conjunction with FIG. 4. In this way, the electronic controller 218 determines an appropriate operating mode of the machine. In the example presented in FIG. 4, the distinction between the two different operating modes represented by the first curve 406 and the second curve 408 can be analytically determined based on each of the two curves. Hence, an underspeed setpoint corresponding to a first mode, MODE 1, may be applied when a curve similar to the first curve 406 has been detected. An underspeed setpoint corresponding to a second mode, MODE 2, may be applied when a curve similar to the second curve 408 has been obtained, and so forth. It can be appreciated any number of modes may be pre-programmed into the controller of the machine, such that an appropriate mode that best fits the curve of data detected may be used to achieve an adaptive underspeed control for the machine.

Industrial Applicability

The present disclosure is applicable to vehicles or machines having hydrostatically operated propel and/or implement driving arrangements. Although a tracked loader is illustrated in FIG. 1, the term "machine" may refer to any machine that performs some type of operation associated with an industry such as mining, construction, farming, transportation, or any other industry known in the art. For example, the machine 100 (FIG. 1) is an earth moving machine, but may alternatively be a wheel loader, excavator, dump truck, backhoe, motor-grader, material handler or the like. Similarly, although a bucket 122 (FIG. 1) is illustrated as the attached implement, an alternative implement may be included. Any implements may be utilized and employed for a variety of tasks, including, for example, loading, compacting, lifting, brushing, and include, for example, buckets, compactors, forked lifting devices, brushes, grapples, cutters, shears, blades, breakers or hammers, augers, and others. Regardless of the type of machine used or the type of implement employed, the methods described herein are advantageously capable of improving the performance of any machine by optimizing the split of power distribution between propel and/or implement arrangements of the machine that are used to move the machine across the terrain and/or perform various tasks.

A machine controlled software algorithm for improving overall machine productivity and power utilization by monitoring machine operation to determine the machine operating mode is presented in the flowchart of FIG. 5. The algorithm collects and/or updates information relative to power consumed by either propel or implement systems of the machine at 502. The information collected is aggregated at 504. Aggregation of information or data may be accomplished continuously for pre-determined times during operation of the machine. In one embodiment, the aggregation of data may be represented by a relatively short duration histogram of various engine and/or machine parameters, for example, transmission and engine speeds, hydraulic pressures in the drive or implement circuits, and so forth.

The aggregate information may be used to infer a usage profile at 506. The usage profile inferred may be based on continuous and/or temporary trends in operation of the machine that are distinguished by the electronic controller. This inferred usage profile might be used to determine an operating mode of the machine at 508. Examples of different operating modes include machines operating in pioneering, ripping, truckloading, and so forth. Having determined the operating mode, the algorithm may use this information to adjust the underspeed set cut-in rates to provide the appropriate power split between tractive power and implement power for the machine. For example, when the algorithm determines that the machine is operating in a truckloading mode, the under speed set point may be set to a higher value such that priority is provided to the implement system. By setting the set point at a relatively higher value, the engine of the machine operates at a higher speed providing a steady flow of hydraulic fluid to the implement actuators, which ensures that more hydraulic fluid is available for operation of the implement system. In this manner, the machine can operate with lower cycle times and at higher engine revolutions. On the other hand, if the algorithm determines that the machine is operating in a ripping mode, the set point may be set lower. The lower set point will allow the engine to operate over a broader range thus providing the opportunity to operate the machine continuously while providing enough power to accommodate peaks in load that the machine might encounter when, for example, an obstacle is met while in operation.

Based on the foregoing, it can be appreciated that a machine operating with the afore presented algorithm can advantageously optimize its operation automatically and without input from the user. The automation of this operation insures that the machine will operate more efficiently and in a more optimized manner over a broader range in duration of operation. Thus, fuel consumption may be reduced and cycle times may be improved during service of the machine and any application.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A machine having at least one motor operable to propel the machine and to at least one implement actuator, the machine having an engine operative at a speed controlled by an underspeed setting, the machine comprising:
  at least one transmission connected to the at least one motor operating to propel the machine;
  an electronic controller associated with the machine, the electronic controller disposed to receive data corresponding to at least one machine operating parameter relative to the at least one transmission, wherein the at least one machine operating parameter includes:

a first parameter, which is indicative of a pressure of fluid at the at least one motor; and a second parameter, which is indicative of a pressure of fluid at the at least one implement actuator;

the electronic controller being further disposed to process the data corresponding to the at least one machine operating parameter to determine an operating mode of the machine and to adapt the underspeed setting for the engine based on the operating mode.

2. The machine of claim 1, wherein the electronic controller is arranged to collect and aggregate the at least one machine operating parameter for a predetermined period.

3. The machine of claim 1, wherein the at least one machine operating parameter is selected from a group consisting of: a pressure of fluid at the at least one motor, a pressure of fluid at at least one implement actuator, a rate of rotation of the engine, a rate of rotation of the at least one motor, a gear setting of the at least one transmission, and a torque output of the engine.

4. The machine of claim 1, wherein the electronic controller is disposed to process the first parameter and the second parameter to provide a histogram graph.

5. The machine of claim 4, wherein the electronic controller is disposed to determine the operating mode of the machine based on information contained in the histogram graph.

6. The machine of claim 1, further including a second motor, wherein the second motor is connected to a second transmission.

7. The machine of claim 6, wherein the at least one transmission and the second transmission are connected to a torque splitter, and wherein the torque splitter is connected to the engine and arranged to transmit power from the engine to the at least one transmission and the second transmission.

8. A method for operating a machine having a tractive system and one or more power consuming systems, comprising:

operating an engine at an engine speed that is above an underspeed setpoint;

generating power from operation of the engine;

splitting power generated into tractive power and into power consumed by the one or more power consuming systems;

consuming power by the tractive system of the machine;

consuming power by the one or more power consuming systems of the machine;

detecting tractive information relative to power consumed by the tractive system of the machine;

detecting respective power consumption information relative to power consumed by each of the one or more power consuming systems of the machine;

processing tractive information and each respective power consumption information and determining an inferred usage profile for the machine;

determining an operating mode of the machine based on the inferred usage profile; and adapting an underspeed set cut-in rate based on the determined operating mode.

9. The method of claim 8, further including detecting at least one parameter relative to the operation of the engine that is selected from a group consisting of: engine speed, engine torque, and engine fueling rate.

10. The method of claim 8, wherein detecting tractive information includes detecting at least one of a pressure of hydraulic fluid and a flow rate of hydraulic fluid flowing through at least a portion of the tractive system of the machine.

11. The method of claim 8, wherein detecting tractive information includes detecting at least one of a electrical voltage and an electrical current.

12. The method of claim 8, wherein processing the tractive information and the respective consumption information includes providing a histogram with respect to time.

13. The method of claim 12, wherein determining the inferred usage profile includes interpreting a distribution of values in the histogram.

14. A control algorithm for improving productivity and power utilization of a machine, the machine being propelled by a propel circuit and performing tasks with an implement powered by an implement circuit, the control algorithm being executed within an electronic controller associated with the machine, the electronic controller disposed to receive information from the propel circuit and the implement circuit, the control algorithm performing the computer implemented steps of:

accessing information provided from at least one sensor disposed on the machine, the at least one sensor disposed to measure machine parameter in at least one of the propel circuit and the implement circuit;

monitoring information collected from the at least one sensor for a duration of time;

calculating a usage profile for the machine based on the information monitored from the at least one sensor;

determining a mode of operation of the machine based on the usage profile; and adaptively adjusting desired underspeed cut-in rate for the machine based on the determined mode of operation.

15. The control algorithm of claim 14, wherein the step of monitoring information collected from the at least one sensor includes calculating a histogram with respect to time.

16. The control algorithm of claim 14, further including the steps of accessing information relative to operation of an engine associated with the machine, and calculating an engine power output parameter based on an engine map lookup function, wherein calculating the usage profile is further based on the engine power output parameter.

17. The control algorithm of claim 14, wherein the at least one sensor is disposed to measure a pressure of hydraulic fluid in the propel circuit, and wherein an additional sensor is disposed to measure a pressure of hydraulic fluid in the implement circuit.

18. The control algorithm of claim 17, wherein the at least one sensor generates a first parameter, which is indicative of power consumed by the propel circuit, and wherein the additional sensor generates a second parameter, which is indicative of power consumed by the implement circuit, and wherein the mode of operation is determined based on the first parameter and the second parameter.

19. The control algorithm of claim 14, wherein setting the desired underspeed cut-in rate is accomplished without an input command from an operator of the machine.

* * * * *